US012338976B2

(12) United States Patent
Watanabe et al.

(10) Patent No.: US 12,338,976 B2
(45) Date of Patent: Jun. 24, 2025

(54) LIGHTING DEVICE

(71) Applicant: Panasonic Intellectual Property Management Co., Ltd., Osaka (JP)

(72) Inventors: Kenta Watanabe, Osaka (JP); Shintaro Hayashi, Hyogo (JP); Takeru Sakamoto, Nara (JP); Seiji Yoshimura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 18/572,028

(22) PCT Filed: Jun. 8, 2022

(86) PCT No.: PCT/JP2022/023085
§ 371 (c)(1),
(2) Date: Dec. 19, 2023

(87) PCT Pub. No.: WO2022/270308
PCT Pub. Date: Dec. 29, 2022

(65) Prior Publication Data

US 2024/0310027 A1 Sep. 19, 2024

(30) Foreign Application Priority Data

Jun. 24, 2021 (JP) ................................ 2021-105230

(51) Int. Cl.

| | |
|---|---|
| ***F21V 15/01*** | (2006.01) |
| ***F21V 31/00*** | (2006.01) |
| ***F21Y 107/40*** | (2016.01) |

(52) U.S. Cl.
CPC ........... *F21V 15/01* (2013.01); *F21V 31/005* (2013.01); *F21Y 2107/40* (2016.08)

(58) Field of Classification Search
CPC ..... F21V 15/01; F21V 31/005; F21Y 2107/40
See application file for complete search history.

(56) References Cited

U.S. PATENT DOCUMENTS 7,018,690 B2 * 3/2006 Lee ........................ A63F 9/1208 428/36.5
10,168,037 B1 * 1/2019 Neuman .................. F21K 9/90
(Continued)

FOREIGN PATENT DOCUMENTS

JP 59-012204 1/1984
JP 3101886 6/2004
(Continued)

OTHER PUBLICATIONS

International Search Report issued in International Pat. Appl. No. PCT/JP2022/023085, dated Jul. 19, 2022, along with an English translation thereof.

*Primary Examiner* — Tsion Tumebo
(74) *Attorney, Agent, or Firm* — GREENBLUM & BERNSTEIN, P.L.C.

(57) ABSTRACT

A lighting device that is capable of illuminating in all directions includes: a case that includes a plurality of wall portions each including a face in a polygonal shape; a plurality of light-emitting elements that are provided in the plurality of wall portions and emit light toward outside of the lighting device; and a controller that controls the plurality of light-emitting elements separately. The case is of an outer shape that is spherical or polyhedral. The case includes bent portions that are bent in the outer shape of the case. The bent portions constitute at least three sides of the outer shape of the case.

13 Claims, 6 Drawing Sheets

(56) References Cited

U.S. PATENT DOCUMENTS

| | | | | |
|---|---|---|---|---|
| 2004/0166292 | A1 | 8/2004 | Lee | |
| 2010/0072895 | A1* | 3/2010 | Glynn | F41H 13/0081 315/209 T |
| 2011/0273073 | A1* | 11/2011 | Lin | F21K 9/232 313/46 |
| 2012/0257374 | A1* | 10/2012 | Daniel | F21K 9/232 362/249.02 |
| 2013/0120989 | A1* | 5/2013 | Sun | F21S 10/02 362/244 |
| 2014/0268700 | A1* | 9/2014 | Mumma | H05B 47/105 362/183 |
| 2014/0292192 | A1 | 10/2014 | Rodinger et al. | |
| 2014/0321120 | A1* | 10/2014 | Pas | F21V 23/009 362/373 |
| 2017/0321867 | A1* | 11/2017 | Hagelaar | F21V 14/003 |
| 2018/0320846 | A1* | 11/2018 | Sozzi | F21V 19/0055 |

FOREIGN PATENT DOCUMENTS

| | | |
|---|---|---|
| JP | 3162613 | 9/2010 |
| JP | 2012-169139 | 9/2012 |
| JP | 2018-142398 | 9/2018 |
| WO | 2020/174904 | 9/2020 |

* cited by examiner

LIGHTING DEVICE

TECHNICAL FIELD

The present disclosure relates to a lighting device.

BACKGROUND ART

Lighting devices capable of illuminating in all directions of 360 degrees have been proposed. For example, Patent Literature (PTL) 1 discloses, as this type of a lighting device, a three-dimensional light source that includes a plurality of planar light sources including light-emitting surfaces and is in a standard three-dimensional shape provided by bending one contiguous surface including at least two of the plurality of planar light sources.

CITATION LIST

Patent Literature

[PTL 1] Japanese Unexamined Patent Application Publication No. 2018-142398

SUMMARY OF INVENTION

Technical Problem

However, PTL 1 has difficulty achieving both a reduction of an increase in the number of assembling processes due to an increase in the number of components and an improvement of dust-proofing and moisture barrier properties by preventing gaps between components from being provided.

In view of this, the present disclosure has an object to provide a lighting device capable of achieving both a reduction of an increase in the number of assembling processes and an improvement of dust-proofing and moisture barrier properties.

Solution to Problem

In order to achieve the above object, a lighting device according to one aspect of the present disclosure is a lighting device capable of illuminating in all direction, the lighting device comprising: a case that includes a plurality of wall portions each including a face in a polygonal shape; a plurality of light-emitting elements that are provided in the plurality of wall portions and emit light toward outside of the lighting device; and a controller that controls the plurality of light-emitting elements separately, wherein the case: is of an outer shape that is spherical or polyhedral; and includes bent portions that are bent in the outer shape of the case, and the bent portions constitute at least three sides of the outer shape of the case.

Advantageous Effects of Invention

The lighting device according to the present disclosure is capable of achieving both a reduction of an increase in the number of assembling processes and an improvement of dust-proofing and moisture barrier properties.

DESCRIPTION OF EMBODIMENTS

Hereinafter, embodiments of the present disclosure are described. It should be noted that the embodiments described below each show a specific example of the present disclosure. Accordingly, the numerical values, constituent elements, the arrangement and connection of the constituent elements, steps and the order of the steps, etc. indicated in the following embodiments are mere examples, and are thus not intended to limit the present disclosure. Therefore, among the constituent elements in the following embodiments, those not recited in the independent claims are described as optional constituent elements.

Moreover, the respective figures are schematic diagrams and are not necessarily accurate illustrations. It should be noted that, in the figures, the same constituent elements are assigned substantially the same reference signs, and overlapping description is omitted or simplified.

Furthermore, terms such as "substantially vertical" and "substantially spherical shape" are used in the following embodiments. For example, "substantially vertical" and "substantially spherical shape" mean not only "completely vertical" and "completely spherical shape," but also "vertical in effect" and "spherical shape in effect," so that the meaning includes an error of about several percent, for example. In addition, "substantially vertical" and "substantially spherical shape" mean vertical and a spherical shape in a range in which the present disclosure can achieve advantageous effects. The same applies to other expressions that include "substantially" and "shape."

Hereinafter, the embodiments are described in detail with reference to the drawings.

Embodiment 1

<Configuration>

The following describes a configuration of lighting device 2 according to the present embodiment.

Figure 1:
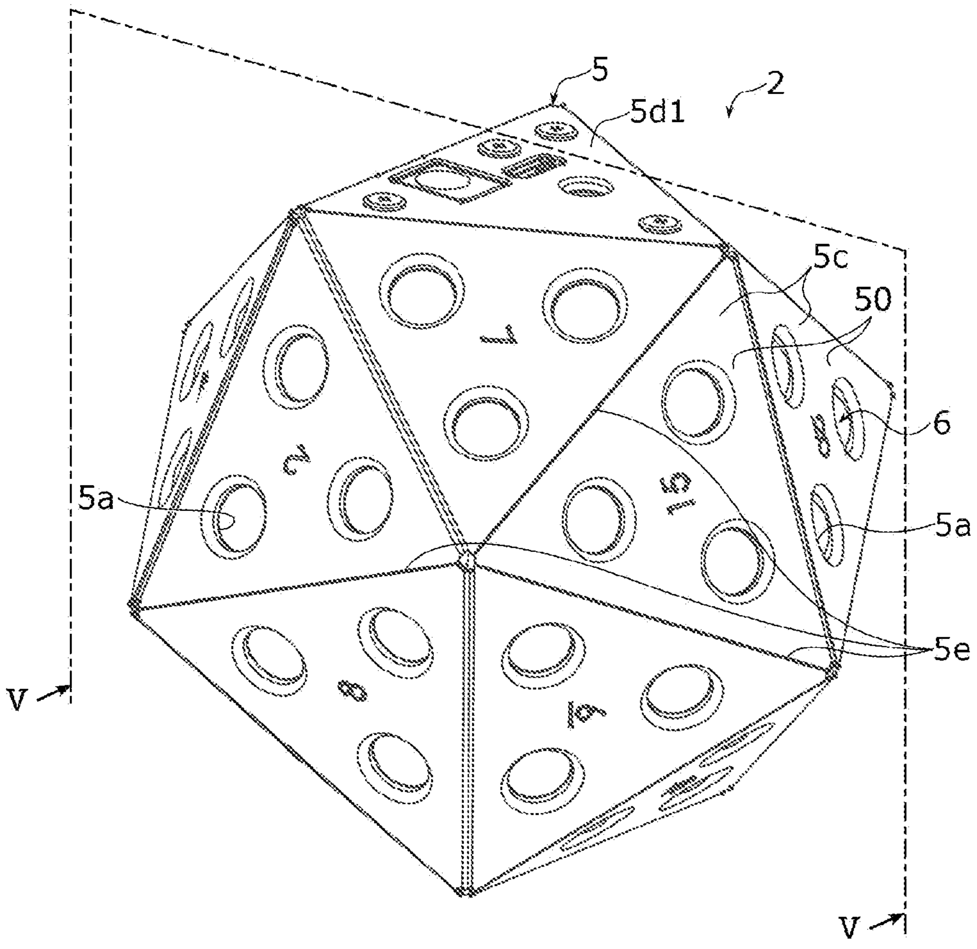
FIG. 1 is a perspective view of a lighting device according to Embodiment 1.
Figure 2:
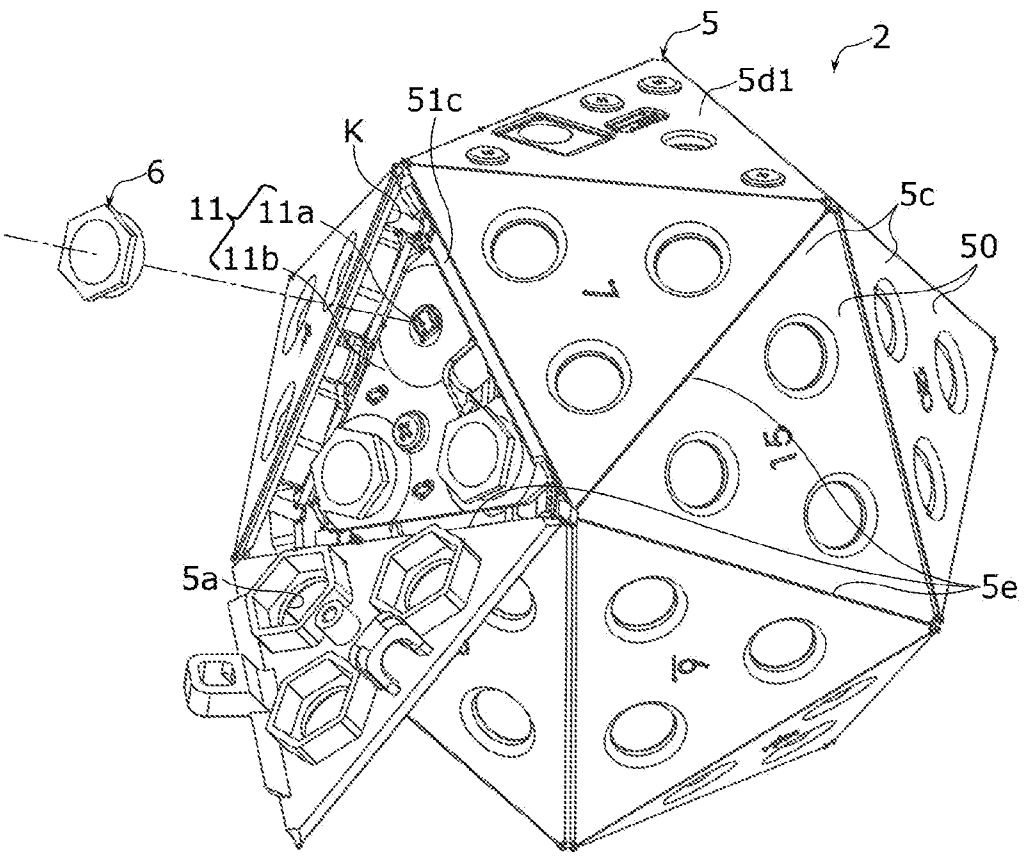
FIG. 2 is an exploded perspective view of the lighting device according to Embodiment 1.
Figure 3:
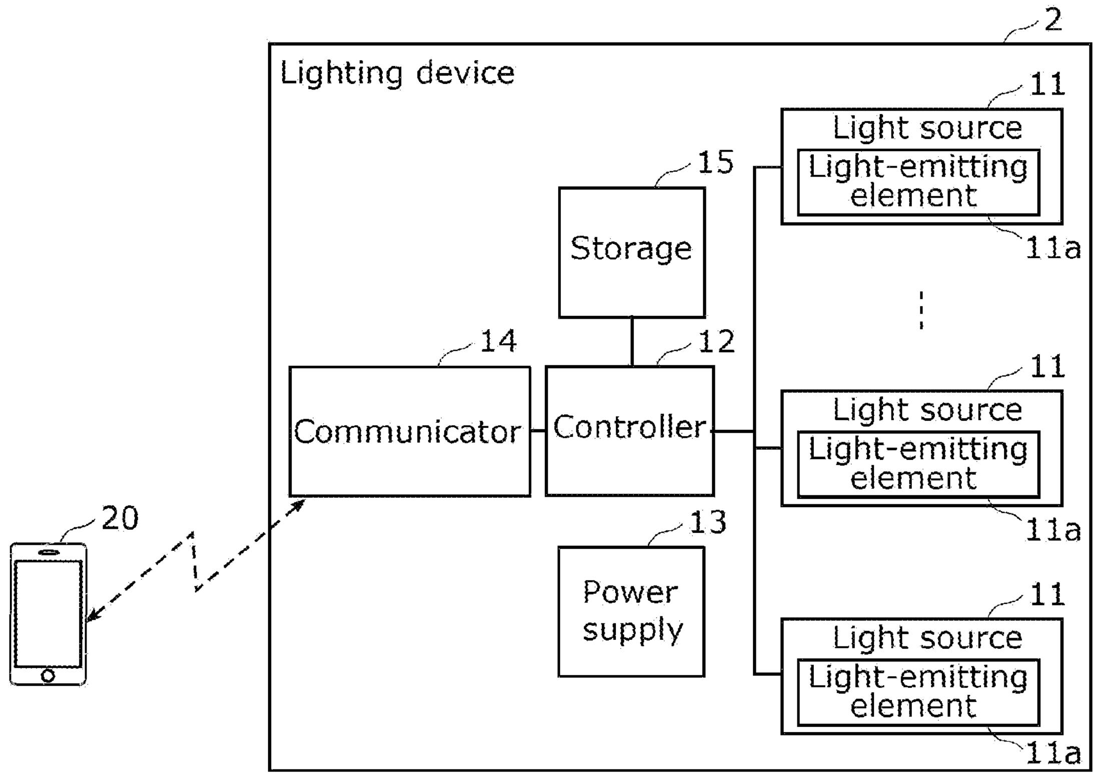
FIG. 3 is a block diagram illustrating the lighting device and a terminal device according to Embodiment 1.

FIG. 1 is a perspective view of lighting device 2 according to the present embodiment. FIG. 2 is an exploded perspective view of lighting device 2 according to the present embodiment. FIG. 3 is a block diagram illustrating lighting device 2 and terminal device 20 according to the present embodiment.

As shown in FIG. 1 to FIG. 3, lighting device 2 is capable of controlling light-emission patterns of a plurality of light sources 11 included in lighting device 2, such as lighting on and off, lighting (illumination) directions, luminance (brightness), and light colors, in response to operating instructions from terminal device 20 shown in FIG. 3. In other words, by accepting an operation inputted by a user, terminal device 20 transmits, to lighting device 2, control information that allows for control of a light-emission pattern of each of the plurality of light sources 11, such as lighting on and off, luminance, a light color, a light-emission period, or blinking. Lighting device 2 is capable of receiving the control information transmitted from terminal device 20, and changing a light-emission pattern according to the received control information. Here, terminal device 20 is a mobile terminal such as a smartphone or a tablet terminal operated by a user.

Moreover, lighting device 2 is installed on, for example, a ceiling, a floor, a wall, or a desk in a room of a building. The outer shape of lighting device 2 is spherical or polyhedral. In the present embodiment, the outer shape of lighting device 2 is an icosahedron having twelve vertices. It should be noted that the outer shape of lighting device 2 is not limited to an icosahedron, and may be another polyhedron.

Furthermore, lighting device 2 is a luminaire capable of radiating light (illuminating) in all directions of 360 degrees, and includes the plurality of light sources 11. The plurality of light sources 11 are substantially disposed across lighting device 2. Here, all directions of 360 degrees refer to all directions from the center of lighting device 2 toward any points. To put it another way, lighting device 2 is capable of causing the plurality of light sources 11 to radiate light in all directions, thereby illuminating all directions.

Moreover, by selectively causing at least one light source 11 among the plurality of light sources 11 to emit light, lighting device 2 is capable of radiating light in any direction from lighting device 2 as a center. For example, lighting device 2 is capable of radiating light in all directions of 360 degrees by causing all the plurality of light sources 11 to emit light simultaneously, or is capable of radiating light only in some directions by causing at least one light source 11 among the plurality of light sources 11 to emit light. In other words, lighting device 2 is capable of not only radiating light in all directions of 360 degrees but also radiating light in any direction in the same manner as a spotlight.

Furthermore, lighting device 2 has a dimming control function and a toning control function. Specifically, lighting device 2 is capable of changing a luminance (brightness) and a light color (color temperature or color) of light to be emitted. In the present embodiment, each of the plurality of light sources 11 is capable of changing a light luminance and a light color in lighting device 2.

Moreover, lighting device 2 according to the present embodiment is capable of evenly illuminating an object such as a wall surface with light in full color. For this reason, as described below, each of the plurality of light sources 11 includes a three-color light source of red, green, and blue (RGB).

In addition, the plurality of light sources 11 are evenly and dispersedly disposed at high densities. Accordingly, by controlling light to be radiated, lighting device 2 is capable of producing a space in which lighting device 2 is disposed.

Furthermore, unlike a display that displays an image, since lighting device 2 according to the present embodiment needs to illuminate a wall surface or the like, the plurality of light sources 11 need to produce a high light output. For this reason, a luminance per light source 11 is high compared to a light-emitting diode (LED) light source used for a backlight of a liquid crystal display, or an LED light source used for an LED display.

Moreover, since the plurality of light sources 11 that are high-output light sources and capable of illuminating in all directions are disposed in lighting device 2 according to the present embodiment, it is difficult to provide a heat-dissipating component such as a heat sink in lighting device 2, compared to conventional lighting devices. Furthermore, since lighting device 2 according to the present embodiment is capable of separately controlling all light-emitting elements 11*a* included in lighting device 2, the amount of heat generation in controller 12 of lighting device 2 increases. In other words, the internal temperature of lighting device 2 is higher than the external temperature of lighting device 2. For this reason, the difference in temperature between the inside and outside of lighting device 2 causes airflow from the outside to inside of lighting device 2 easily. Accordingly, for example, when a case forming an exterior of a lighting device has a gap, dirt, dust, and water vapor enter easily through the gap together with airflow. In view of this, in order to prevent dirt, dust, and water vapor from entering, lighting device 2 includes the following configuration.

Lighting device 2 includes case 5, a plurality of light-transmitting portions 6, a plurality of light sources 11, controller 12, power supply 13, storage 15, and communicator 14.

[Case 5]

Case 5 is an exterior cover that is of an outer shape that is spherical or polyhedral. Case 5 includes a plurality of wall portions 5*c* each of which includes face 50 in a polygonal shape. Here, the polygonal shape is at least one of a triangular shape, a quadrilateral shape, a pentagonal shape, or a hexagonal shape. Moreover, face 50 in the polygonal shape is an outer face of case 5. Furthermore, face 50 in the polygonal shape is a flat face or a curved face.

In the present embodiment, the outer faces of case 5 include twenty triangular faces. In other words, case 5 is an icosahedron having twelve vertices.

It should be noted that the outer shape of case 5 is not limited to an icosahedron. Examples of the outer shape of case 5 include a tetrahedron including triangular faces, a hexahedron including quadrilateral faces, a dodecahedron including pentagonal faces, an icosidodecahedron including pentagonal faces and hexagonal faces, and a snub dodecahedron including triangular faces and pentagonal faces.

Case 5 includes bent portions 5*e* that are bent in the outer shape of case 5. Bent portions 5*e* constitute at least three sides of the outer shape of case 5. Specifically, bent portion 5*e* is a border portion between two adjacent wall portions 5*c*, and is provided by bending the border portion. Bent portion 5*e* thus provided connects two adjacent wall portions 5*c* integrally, and forms one side of the outer shape of case 5.

Figure 4:
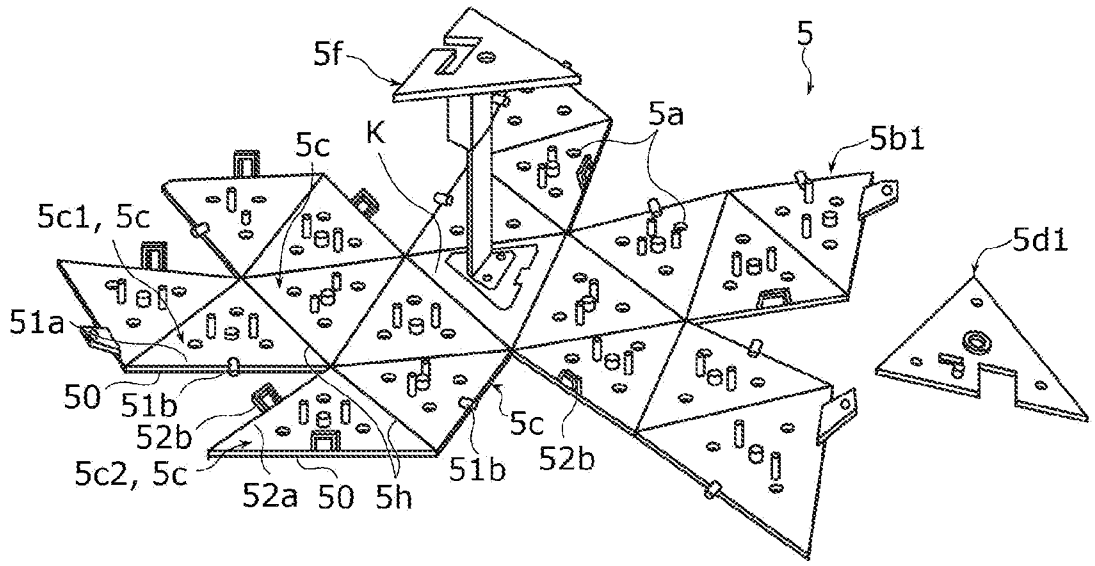
FIG. 4 is a diagram illustrating a first tabular component and a second tabular component in a state before a case that is of an outer shape that is spherical or polyhedral is provided.
Figure 5:
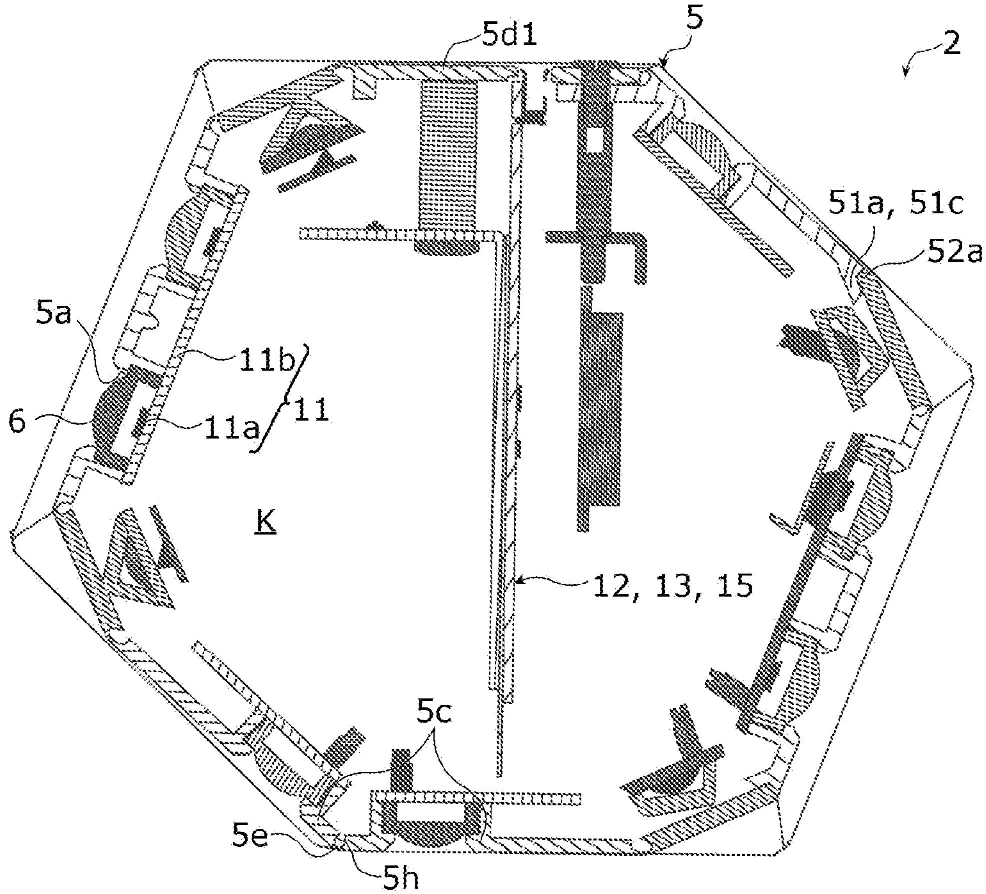
FIG. 5 is a cross-sectional view of the lighting device, taken along line V-V shown in FIG. 1.

The following describes a state before the outer shape of case 5 is provided and a state of case 5 when the outer shape of case 5 is provided with reference to FIG. 4 and FIG. 5. FIG. 4 is a diagram illustrating first tabular component 5*b*1 and a second tabular component in a state before case 5 that is of the outer shape that is spherical or polyhedral is provided. FIG. 5 is a cross-sectional view of lighting device 2, taken along line V-V shown in FIG. 1.

As shown in FIG. 4, case 5 includes first tabular component 5*b*1 and predetermined wall portion 5*d*1 that is the second tabular component. First tabular component 5*b*1 is a development view of case 5, and it is possible to provide case 5 by bending first tabular component 5*b*1. It should be noted that case 5 may include one tabular component obtained by connecting first tabular component 5_b_1 and the second tabular component integrally.

As shown in FIG. 4 and FIG. 5, in first tabular component 5_b_1, groove portion 5_h_ is provided in a border portion between two adjacent wall portions 5_c_ integrally connected. Groove portion 5_h_ is provided on an internal space K side of case 5. Accordingly, first tabular component 5_b_1 is bent for each wall portion 5_c_ including face 50 in the polygonal shape. Bent portion 5_e_ shown in FIG. 1 is provided by bending first tabular component 5_b_1 for each wall portion 5_c_.

Moreover, when first tabular component 5_b_1 is bent for each wall portion 5_c_, first tabular component 5_b_1 includes a portion in which first edge portion 51_a_ that is one side of first wall portion 5_c_1 among the plurality of wall portions 5_c_ is in contact with second edge portion 52_a_ that is one side of second wall portion 5_c_2 different from first wall portion 5_c_1 among the plurality of wall portions 5_c_. For this reason, it is necessary to secure first edge portion 51_a_ and second edge portion 52_a_ by connecting first edge portion 51_a_ and second edge portion 52_a_.

Here, a case in which first edge portion 51_a_ and second edge portion 52_a_ are connected is described with reference to FIG. 6 and FIG. 7.

Figure 6:
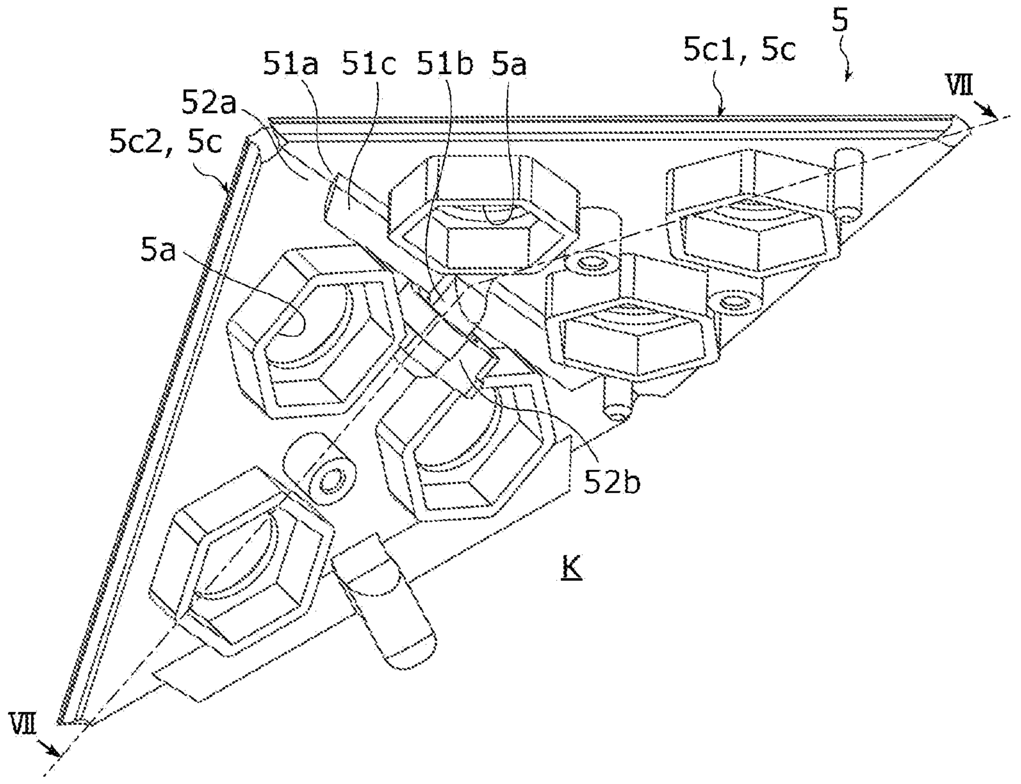
FIG. 6 is a perspective view of a first wall portion and a second wall portion of the case in the lighting device according to Embodiment 1.

FIG. 6 is a perspective view of first wall portion 5_c_1 and second wall portion 5_c_2 of case 5 in lighting device 2 according to Embodiment 1. FIG. 7 is a cross-sectional view of first wall portion 5_c_1 and second wall portion 5_c_2 of case 5, taken along line VII-VII shown in FIG. 6. It should be noted that FIG. 6 and FIG. 7 show only first wall portion 5_c_1 and second wall portion 5_c_2 of case 5.

Figure 7:
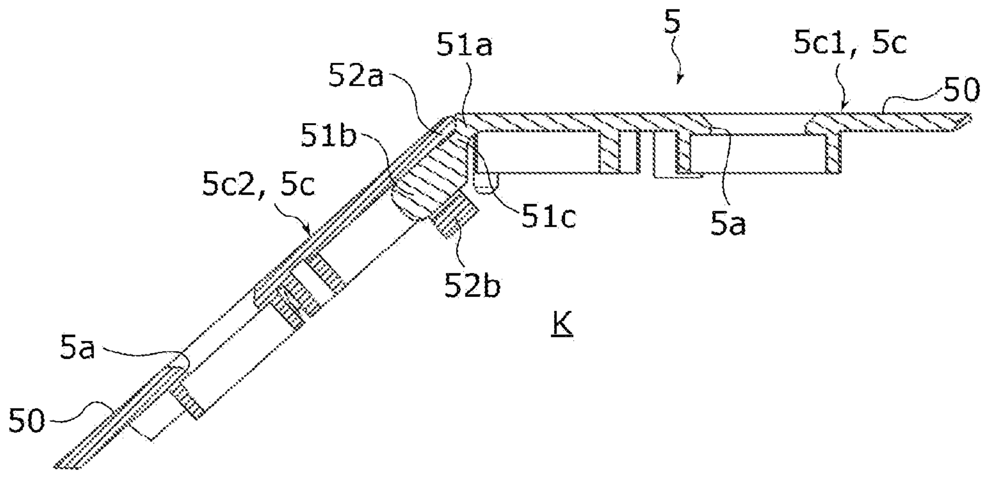
FIG. 7 is a cross-sectional view of the first wall portion and the second wall portion of the case, taken along line VII-VII shown in FIG. 6.

As shown in FIG. 6 and FIG. 7, the plurality of wall portions 5_c_ include first wall portion 5_c_1 and second wall portion 5_c_2 disposed adjacent to first wall portion 5_c_1. In addition, engaging portion 51_b_ is provided in first edge portion 51_a_ of first wall portion 5_c_1, and engaged portion 52_b_ is provided in second edge portion 52_a_ of second wall portion 5_c_2. By causing engaging portion 51_b_ to engage with engaged portion 52_b_, first edge portion 51_a_ and second edge portion 52_a_ are connected to overlap each other. Such connection allows first edge portion 51_a_ and second edge portion 52_a_ shown in FIG. 1 to constitute one side of the outer shape of case 5. As stated above, since first edge portion 51_a_ includes engaging portion 51_b_ and second edge portion 52_a_ includes engaged portion 52_b_, it is unnecessary to perform a fixing process such as fixing first edge portion 51_a_ and second edge portion 52_a_ with a fastening component such as a screw.

In the present embodiment, when first edge portion 51_a_ and second edge portion 52_a_ are fit together, engaging portion 51_b_ is a columnar body extending from first edge portion 51_a_ toward engaged portion 52_b_. Additionally, engaged portion 52_b_ is an insertion portion including an insertion hole into which engaging portion 51_b_ is inserted.

As shown in FIG. 1 and FIG. 4, bending first tabular component 5_b_1 for each wall portion 5_c_ makes it possible to provide the outer shape of case 5 that is spherical or polyhedral while providing bent portion 5_e_ in first tabular component 5_b_1.

Moreover, as shown in FIG. 4, support 5_f_ for supporting first tabular component 5_b_1 and the second tabular component and supporting controller 12 is attached to first tabular component 5_b_1. Support 5_f_ is connected to wall portion 5_c_ located on the bottom side of case 5 and predetermined wall portion 5_d_1 located on the top side of case 5. Accordingly, support 5_f_ is capable of holding the outer shape of case 5 firmly.

It should be noted that, in the present embodiment, a power supply connector for supplying power to power supply 13 from an external power source, a communication connector for communicating with an external device and terminal device 20, and a connecting portion to which a metal hook serving as an attaching component for attaching lighting device 2 to a ceiling, a wall, or the like are provided on predetermined wall portion 5_d_1 among the plurality of wall portions 5_c_. In the present embodiment, light source 11 is not disposed on predetermined wall portion 5_d_1. It should be noted that light source 11 may be disposed on predetermined wall portion 5_d_1.

Furthermore, as shown in FIG. 2, FIG. 6, and FIG. 7, first edge portion 51_a_ and second edge portion 52_a_ are connected to overlap each other. Specifically, tabular piece 51_c_ that engages with second edge portion 52_a_ is provided on first edge portion 51_a_. Tabular piece 51_c_ is elongated in the longitudinal direction of first edge portion 51_a_. In the present embodiment, tabular piece 51_c_ is provided integrally with engaging portion 51_b_. When first edge portion 51_a_ and second edge portion 52_a_ are connected, tabular piece 51_c_ overlaps second edge portion 52_a_. In this case, tabular piece 51_c_ is disposed on the internal space K side of case 5. As a result, it is possible to fill a gap between first edge portion 51_a_ and second edge portion 52_a_. Accordingly, tabular piece 51_c_ makes it possible to prevent dirt, dust, and water vapor from entering the gap between first edge portion 51_a_and second edge portion 52_a_.

Moreover, case 5 according to the present embodiment contains a resin material such as polycarbonate, acrylonitrile butadiene styrene (ABS), and polycarbonate (PC). It should be noted that case 5 may contain a metal material including aluminum, iron, or the like as a main component.

As shown in FIG. 5, internal space K is provided in case 5. The plurality of light sources 11, controller 12, power supply 13, storage 15, etc. are disposed in internal space K. In other words, internal space K is an installation space for installing the plurality of light sources 11, controller 12, power supply 13, storage 15, etc.

As shown in FIG. 2 and FIG. 6, a plurality of through holes 5_a_ for transmitting light emitted by each of the plurality of light sources 11_a_ are provided in case 5. The plurality of through holes 5_a_ correspond to the plurality of light-emitting elements 11_a_ on a one-to-one basis, and are provided in positions opposite to positions of the plurality of light-emitting elements 11_a_. In the present embodiment, through hole 5_a_ is provided on a corner side of wall portion 5_c_. Additionally, in the present embodiment, three through holes 5_a_ are provided on each of the plurality of wall portions 5_c_. It should be noted that the number of through holes 5_a_ provided on each of the plurality of wall portions 5_c_ may be at most two or at least four.

[Light-Transmitting Portion 6]

As shown in FIG. 2, light-transmitting portion 6 contains a light-transmitting material such as a light-transmissive resin material including transparent resin, or a transparent glass material. Each of a plurality of light-transmitting portions 6 is capable of transmitting light emitted from light source 11.

Moreover, light-transmitting portion 6 is provided in each of the plurality of through holes 5_a_. The plurality of light-transmitting portions 6 correspond to the plurality of light-emitting elements 11_a_ on a one-to-one basis. To put it another way, the plurality of light-transmitting portions 6 are disposed opposite to the plurality of light-emitting elements 11_a_ on a one-to-one basis.

Furthermore, light-transmitting portion 6 includes a lens that performs light distribution control to cause light emitted by light-emitting element 11*a* and passing through light-transmitting portion 6 to have a narrow angle or a wide angle.

Moreover, a plurality of microasperities (dots, prisms) may be provided on the surface of light-transmitting portion 6 by, for example, surface texturing, or a dot pattern may be printed on the surface of the same. This makes it difficult to visually recognize light-emitting element 11*a* inside case 5 of lighting device 2 through light-transmitting portion 6 from the outside. Additionally, in this case, light-transmitting portion 6 is capable of mixing light emitted from light-emitting element 11*a*. For this reason, light-transmitting portion 6 is capable of reducing color unevenness of light exiting through the surface of light-transmitting portion 6.

[Light Source 11]

The plurality of light sources 11 are disposed in internal space K of case 5 to form a spherical shape or a polyhedron shape in accordance with the outer shape of case 5. Accordingly, the plurality of light sources 11 form a shape similar to the outer shape of case 5. In the present embodiment, 19 light sources 11 are provided except for predetermined wall portion 5*d*1, and 19 light sources 11 form an icosahedron shape substantially.

Each of the plurality of light sources 11 includes one or more light-emitting elements 11*a* and substrate 11*b*.

Light-emitting elements 11*a* are substantially disposed across lighting device 2. In other words, light-emitting elements 11*a* are scattered to make it possible to radiate light in all directions from lighting device 2. In addition, light-emitting elements 11*a* are disposed at specified intervals when lighting device 2 is holistically viewed. In the present embodiment, a plurality of light-emitting elements 11*a* are mounted on one substrate 11*b*. Additionally, a plurality of light-emitting elements 11*a* are disposed at specified intervals on each of substrates 11*b*.

Moreover, each of the plurality of light-emitting elements 11*a* is capable of illuminating in a corresponding direction. In the present embodiment, since a plurality of light-emitting elements 11*a* are mounted on one substrate 11*b*, the plurality of light-emitting elements 11*a* on same substrate 11*b* emit light in the same direction. It should be noted that even when a plurality of light-emitting elements 11*a* are on same substrate 11*b*, each of the plurality of light-emitting elements 11*a* may emit light in a different direction.

Furthermore, each of the plurality of light-emitting elements 11*a* emits light outward of lighting device 2. Specifically, the optical axis of light-emitting element 11*a* is a direction perpendicular to the face included in a corresponding one of the plurality of wall portions 5*c*. Here, the optical axis is a straight line along principal light emitted by light-emitting element 11*a*.

Moreover, each light-emitting element 11*a* is capable of emitting light in at least two colors. Specifically, each light-emitting element 11*a* is a light source of three colors of RGB, and is capable of emitting monochromatic light in three colors such as red light, blue light, and green light, and at the same time emitting color light or white light obtained by dimming the monochromatic light in these three colors.

Specifically, each light-emitting element 11*a* is a surface-mounted device (SMD) LED element in which an LED is packaged, and includes a container (package), a plurality of LED chips mounted within the container, and a seal component that seals the plurality of LED chips. In the present embodiment, red LED chips that emit red light, blue LED chips that emit blue light, and green LED chips that emit green light are mounted as the plurality of LED chips. The seal component is a light-transmitting insulating resin material such as silicone resin. It should be noted that a light diffusing material such as silica, a filer, or the like may be dispersed in the seal component.

Substrate 11*b* is in a shape corresponding to face 50 in the polygonal shape in case 5. For this reason, the shape of each substrate 11*b* is a polygonal shape. It is possible to form a spherical shape or a polygonal shape corresponding to the outer shape of case 5 by combining the plurality of substrates 11*b*.

Moreover, since substrate 11*b* is in the shape corresponding to face 50 in the polygonal shape in case 5, substrate 11*b* is in at least one of a triangular shape, a quadrilateral shape, a pentagonal shape, or a hexagonal shape. In the present embodiment, substrate 11*b* is in a triangular shape.

Furthermore, substrate 11*b* is a mounting substrate including a mounting surface for mounting light-emitting element 11*a*. A plurality of light-emitting elements 11*a* are regularly disposed on substrate 11*b*. In the present embodiment, light-emitting element 11*a* is mounted on each of corner portion sides of substrate 11*b* in the polygonal shape.

It should be noted that, though not shown in the figure, metal wiring, a connector for power supply, etc. are provided on the mounting surface of substrate 11*b*. In the present embodiment, the connector for power supply of substrate 11*b* is electrically connected to controller 12 shown in FIG. 3 with single wiring by the connector for power supply of substrate 11*b* being electrically connected to a connector for power supply of another substrate 11*b*.

Moreover, substrate 11*b* is fastened to case 5 by being attached to each of the plurality of wall portions 5*c* in case 5 with a fastening component such as a screw. Accordingly, the plurality of substrates 11*b* are held in the spherical shape or the polygonal shape by case 5.

Examples of substrate 11*b* include: a metal base substrate obtained by applying an insulating film to a base material containing a metal material such as aluminum or copper; a ceramic substrate that is a sintered compact of a ceramic material such as alumina; or a resin substrate including a resin material as a base. In the present embodiment, a printed circuit substrate including a glass epoxy substrate in which metal wiring is provided is used as substrate 11*b*. It should be noted that substrate 11*b* is a rigid substrate but may be a flexible substrate.

[Controller 12]

As shown in FIG. 3, controller 12 is a control circuit that controls each part of lighting device 2. Controller 12 performs various types of control by, for example, a processor executing programs held in storage 15. The processor includes, for example, a micro processing unit (MPU), central processing unit (CPU), a digital signal processor (DSP), a graphical processing unit (GPU), or a system on a chip (SoC).

Moreover, controller 12 executes light-emission patterns stored in storage 15 to control a plurality of light sources 11 according to the light-emission patterns. Specifically, controller 12 controls a light-emission pattern in which each light-emitting element 11*a* emits light, according to control information obtained from storage 15 or an external device. In other words, controller 12 is capable of separately controlling light-emitting elements 11*a* of all light sources 11 included in lighting device 2 shown in FIG. 2. For example, controller 12 controls lighting on and off (lighting on, lighting off), brightness, or a light color according to the light-emission pattern of each light-emitting element 11*a*.

Furthermore, in the present embodiment, controller 12 is a control circuit in an elongated tabular shape or a columnar shape, and disposed in case 5 to be in an orientation perpendicular to predetermined wall portion 5*d*1 shown in FIG. 1 on which the power supply connector and the like are provided. Specifically, controller 12 is disposed in a standing-up orientation substantially perpendicular to predetermined wall portion 5*d*1. Accordingly, controller 12 is capable to reinforcing case 5 provided by bending first tabular component 5*b*1 from inside. To put it another way, since controller 12 is in the elongated tabular shape or the columnar shape, controller 12 is capable of ensuring the strength of case 5.

[Power Supply 13]

Power supply 13 serves to supply power to each part of lighting device 2. Power supply 13 is, for example, a power supply circuit in which a plurality of electronic components are mounted on a printed substrate. Power supply 13 generates, for example, driving power for causing each of a plurality of light sources 11 to emit light. Specifically, power supply 13 generates driving power for causing each light source 11 to emit light, and supplies the driving power to each light source 11. In other words, power supply 13 converts commercial alternating-current power to direct-current power, and supplies, as driving power for causing each light source 11 to emit light, the direct-current power to light source 11 to cause light-emitting elements 11*a* of light source 11 shown in FIG. 2 to emit light.

[Communicator 14]

Communicator 14 serves to communicate with terminal device 20. Specifically, communicator 14 receives, from terminal device 20, control information for controlling a light-emission pattern of lighting device 2. An operating instruction and the control information received by communicator 14 are outputted to controller 12. Examples of a communication scheme used by communicator 14 include wide area network (WAN), local area network (LAN), power line communication, infrared communication, near field communication (e.g., Bluetooth (registered trademark) communication), or mobile communication for mobile phones.

[Storage 15]

Storage 15 stores, for example, light-emission patterns of a plurality of light sources 11. Moreover, light-emission patterns are stored into storage 15 by being set by terminal device 20 or being obtained from an external device. Furthermore, control information or the like obtained by controller 12 is periodically stored into storage 15. Storage 15 includes, for example, a primary storage device such as random-access memory (RAM) and read-only memory (ROM). Additionally, storage 15 may include a secondary storage device such as a hard disk drive (HDD) and a solid state drive (SSD) or a tertiary storage device such as an optical disk and an SD card.

<Advantageous Effects>

Next, advantageous effects of lighting device 2 according to the present embodiment are described.

For example, with regard to a conventional lighting device, when each of a plurality of wall portions includes separate and independent components, it is necessary to assemble a case by connecting as many components as the number of the components. In this case, the conventional lighting device has a large number of components, and the number of assembling processes increases.

Moreover, with regard to the conventional lighting device, even when the case is assembled by connecting the plurality of wall portions that are components, a gap is provided between edge portions of two adjacent wall portions. In this case, dirt, dust, and water vapor enter the conventional lighting device through this gap.

As stated above, lighting device 2 according to the present embodiment is a lighting device capable of illuminating in all directions, lighting device 2 including: case 5 that includes a plurality of wall portions 5*c* each including face 50 in a polygonal shape; a plurality of light-emitting elements 11*a* that are provided in the plurality of wall portions 5*c* and emit light toward outside of lighting device 2; and controller 12 that controls the plurality of light-emitting elements 11*a* separately. Case 5 is of an outer shape that is spherical or polyhedral. Case 5 includes bent portions 5*e* that are bent in the outer shape of case 5. Bent portions 5*e* constitute at least three sides of the outer shape of case 5.

Accordingly, the outer shape of case 5 that is spherical or polyhedral is provided by case 5 being bent. As a result, it is possible to reduce an increase in the number of components, compared to a case in which each of the plurality of wall portions 5*c* of case 5 includes separate and independent components.

Moreover, since bent portion 5*e* is a bent line, a gap is not provided between two adjacent wall portions 5*c*. Consequently, case 5 makes it possible to prevent the number of gaps provided between two adjacent wall portions 5*c* from increasing.

Therefore, lighting device 2 is capable of achieving both a reduction of an increase in the number of assembling processes and an improvement of dust-proofing and moisture barrier properties. In consequence, it is possible to achieve both a reduction of a steep rise in manufacturing costs of lighting device 2 and protection of electronic devices disposed in case 5.

Especially, since case 5 is provided by being bent, lighting device 2 is capable of preventing the number of gaps provided in case 5 from increasing. Since this makes it possible to ensure the strength of case 5, case 5 is capable of protecting light-emitting elements 11*a* even when an external shock is given to lighting device 2.

Furthermore, in lighting device 2 according to the present embodiment, the polygonal shape is at least one of a triangular shape, a quadrilateral shape, a pentagonal shape, or a hexagonal shape.

Those polygonal shapes make it possible to provide a spherical shape or a polyhedral shape such that the outer shape of case 5 does not become too complex.

Moreover, in lighting device 2 according to the present embodiment, the plurality of wall portions 5*c* includes first wall portion 5*c*1 and second wall portion 5*c*2 adjacent to first wall portion 5*c*1. In addition, first edge portion 51*a* and second edge portion 52*a* constitute one side of the outer shape of case 5 and are connected to overlap each other, first edge portion 51*a* being one side of first wall portion 5*c*1, second edge portion 52*a* being one side of second wall portion 5*c*2.

Accordingly, when case 5 is viewed from the outside, it is possible to fill a gap between first edge portion 51*a* and second edge portion 52*a*. As a result, it is possible to prevent dirt, dust, and water vapor from entering between first edge portion 51*a* and second edge portion 52*a*. Therefore, lighting device 2 is capable of further improving the dust-proofing and moisture barrier properties.

Embodiment 2

<Configuration>

The following describes a configuration of lighting device 2a according to the present embodiment.

Figure 8:
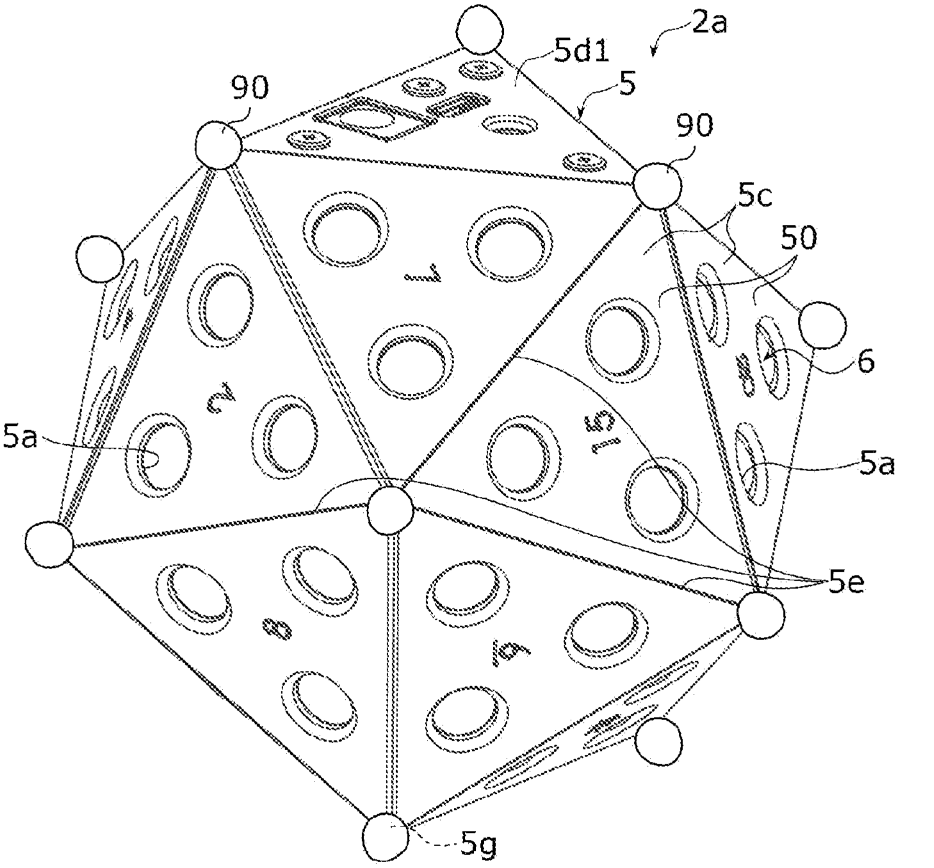
FIG. 8 is a perspective view of a lighting device according to Embodiment 2.

FIG. 8 is a perspective view of lighting device 2a according to Embodiment 2.

Lighting device 2a according to the present embodiment differs from lighting device 2 according to Embodiment 1 in that protective component 90 is provided at a vertex of case 5 as shown in FIG. 8. The same reference signs are assigned to constituent elements and functions of lighting device 2a according to the present embodiment that are identical to those of lighting device 2 according to Embodiment 1, and detailed description of the constituent elements and functions of lighting device 2a is omitted.

Lighting device 2a includes protective component 90 in addition to case 5, the plurality of light-transmitting portions 6, the plurality of light sources 11, controller 12, power supply 13, storage 15, and communicator 14 shown in FIG. 3.

[Protective Component 90]

Since the spherical or polyhedral outer shape of case 5 according to the present embodiment is provided by bending first tabular component 5b1 while providing faces 50 in the polygonal shape, gap 5a1 is provided at vertex portion 5g of case 5. Accordingly, when protective component 90 is provided in gap 5a1 at vertex portion 5g of case 5, protective component 90 makes it possible to cover vertex portion 5g of case 5 and fill gap 5a1 provided at vertex portion 5g of case 5. In the present embodiment, protective components 90 are provided at all vertex portions 5g in case 5.

Figure 9:
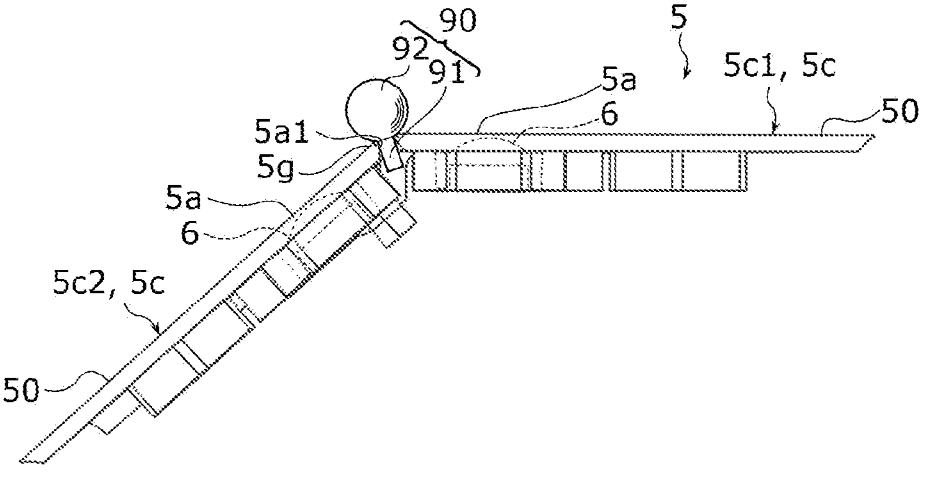
FIG. 9 is a diagram illustrating a plurality of wall portions, light-transmitting portions, and a protective component in a case.

As shown in FIG. 9, such protective component 90 is in, for example, a pin shape. FIG. 9 is a diagram illustrating a plurality of wall portions 5c, light-transmitting portions 6, and protective component 90 in case 5.

Specifically, protective component 90 includes insertion portion 91 and head portion 92.

Insertion portion 91 is in a columnar shape that is insertable into gap 5a1 provided at vertex portion 5g of case 5, and projects from head portion 92.

Moreover, insertion portion 91 is equal in size and shape to the opening surface of gap 5a1 at vertex portion 5g of case 5. For this reason, protective component 90 is fixed to vertex portion 5g of case 5 by insertion portion 91 being inserted into gap 5a1 at vertex portion 5g of case 5.

Head portion 92 is in, for example, a columnar shape, a spherical shape, or a polygonal shape. Head portion 92 is a portion exposed from case 5 when protective component 90 is provided at vertex portion 5g of case 5. In other words, head portion 92 is provided in a state in which head portion 92 projects from a plurality of faces 50 in the polygonal shape in case 5.

Furthermore, when protective component 90 is viewed along face 50 in the polygonal shape included in each of wall portions 5c constituting vertex portion 5g, head portion 92 projects further outward of case 5 than face 50 in the polygonal shape. In addition, when protective component 90 is viewed along face 50 I the polygonal shape, protective component 90 projects further outward of case 5 than light-transmitting portion 6. In this case, when lighting device 2a is placed on a flat mounting surface, it is possible to separate face 50 in the polygonal shape and light-transmitting portion 6 from the flat mounting surface by head portions 92 abutting on the flat mounting surface. Accordingly, protective component 90 makes it possible to prevent face 50 in the polygonal shape and light-transmitting portion 6 in case 5 from being damaged as a result of contacting the flat mounting surface.

Moreover, in the present embodiment, protective component 90 contains a resin material such as polycarbonate or ABS. It should be noted that protective component 90 may contain a metal material including aluminum, iron, or the like as a main component.

<Advantageous Effects>

Next, advantageous effects of lighting device 2a according to the present embodiment are described.

As stated above, lighting device 2a according to the present embodiment includes protective component 90 that is provided to cover vertex portion 5g of case 5.

Accordingly, when the outer shape of case 5 that is spherical or polyhedral is provided by bending a tabular component while providing faces 50 in the polygonal shape, gap 5a1 is provided at vertex portion 5g of case 5. In the present embodiment, however, protective component 90 is capable of filling gap 5a1 at vertex portion 5g of case 5. Therefore, lighting device 2a is capable of further improving the dust-proofing and moisture barrier properties.

Moreover, in lighting device 2 according to the present embodiment, when protective component 90 is viewed along face 50 in the polygonal shape, protective component 90 projects further outward of case 5 than faces 50 in the polygonal shape that constitute vertex portion 5g.

Accordingly, when lighting device 2a is placed on a mounting surface, protective components 90 are capable of separating respective faces 50 in the polygonal shape from the mounting surface. As a result, protective components 90 are capable of protecting respective faces 50 in the polygonal shape from being damaged. Additionally, protective components 50 are also capable of protecting vertex portions 5g of case 5 from being damaged.

In addition, when lighting device 2a is placed on a mounting surface, a space is provided by protective components 90 between respective faces 50 in the polygonal shape and the mounting surface. For this reason, it is possible to transmit light emitted by light sources 11 facing the mounting surface to the outside of lighting device 2a.

Furthermore, in lighting device 2a according to the present embodiment, light-transmitting portion 6 that transmits light emitted by light-emitting element 11a is provided in at least one wall portion 5c among the plurality of wall portions 5c. When protective component 90 is viewed along face 50 in the polygonal shape, protective component 90 projects further outward of case 5 than light-transmitting portion 6.

Accordingly, when lighting device 2a is placed on a mounting surface, protective component 90 is capable of separating light-transmitting portion 6 from the mounting surface. For this reason, protective component 90 is capable of preventing light-transmitting portion 6 from being damaged.

The present embodiment produces the same advantageous effects as those described above.

[Other Variations]

Although the lighting device according to the present disclosure has been described based on each of Embodiments 1 and 2, the present disclosure is not limited to Embodiments 1 and 2. Forms obtained by various modifications to Embodiments 1 and 2 that can be conceived by a person skilled in the art may be included in the scope of the present disclosure, as long as they do not depart from the essence of the present disclosure.

For example, the lighting device according to each of Embodiments 1 and 2 and a terminal device may constitute a lighting system. In this case, the lighting system may be capable of controlling the lighting device based on control information for executing a light-emission pattern, by the terminal device being operated. It should be noted that the lighting system may be capable of obtaining, from an external device via a network, control information in which a light-emission pattern of the lighting device is set.

Moreover, the controller included in the lighting device according to each of Embodiments 1 and 2 is typically implemented as a large scale integration (LSI) that is an integrated circuit. They may take the form of individual chips, or some or all of them may be encapsulated into a single chip.

Furthermore, the integrated circuit is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

It should be noted that, in Embodiments 1 and 2, each of the constituent elements may be implemented as dedicated hardware or may be realized by executing a software program suited to the constituent element. Alternatively, each of the constituent components may be implemented by a program executor such as a CPU or a processor reading out and executing the software program recorded in a recording medium such as a hard disk or a semiconductor memory.

Moreover, all the numerical values used above are mere examples for describing the present disclosure specifically, and thus Embodiments 1 and 2 of the present disclosure are not limited by these exemplary numerical values.

Furthermore, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Moreover, the functions of a plurality of functional blocks having similar functions may be processed by single hardware or software in a parallelized or time-divided manner.

It should be noted that the present disclosure includes forms obtained by various modifications to Embodiments 1 and 2 that can be conceived by a person skilled in the art, as well as forms achieved by arbitrarily combining the constituent elements and functions in Embodiments 1 and 2, without materially departing from the essence of the present disclosure.

The invention claimed is:

1. A lighting device capable of illuminating in all directions, the lighting device comprising:

- a case that includes a plurality of wall portions, each including a face in a polygonal shape, the plurality of wall portions including a first wall portion and a second wall portion different from the first wall portion;
- a plurality of light-emitting elements that are provided in the plurality of wall portions and emit light toward the outside of the lighting device;
- a controller that controls the plurality of light-emitting elements separately; and
- a protective component without openings that is provided to cover a vertex portion of the case, wherein the case:

- is of an outer shape that is spherical or polyhedral; and
- includes bent portions that are bent in the outer shape of the case,
- the bent portions constitute at least three sides of the outer shape of the case,
- one side of the first wall portion includes a first edge portion,
- the first edge portion includes an engaging portion and a tabular piece,
- one side of the second wall portion includes a second edge portion,
- the first and second edge portions are in contact with each other,
- the second edge portion includes an engaged portion configured to engage with the engaging portion of the first edge portion, and
- the tabular piece of the first edge portion is configured to engage with the second edge portion.

2. The lighting device according to claim 1, wherein the polygonal shape is at least one of a triangular shape, a quadrilateral shape, a pentagonal shape, or a hexagonal shape.

3. The lighting device according to claim 1, wherein when the protective component is viewed along the face in the polygonal shape, the protective component projects further outward of the case than a face in the polygonal shape included in each of wall portions that constitute the vertex portion among the plurality of wall portions.

4. The lighting device according to claim 1, wherein the first edge portion and the second edge portion comprise one side of the outer shape of the case and are connected to overlap each other.

5. The lighting device according to claim 1, wherein a light-transmitting portion is provided in at least one wall portion among the plurality of wall portions, the light-transmitting portion transmitting light emitted by a light-emitting element among the plurality of light-emitting elements, and when the protective component is viewed along the face in the polygonal shape, the protective component projects further outward of the case than the light-transmitting portion.

6. The lighting device according to claim 1, wherein the protective component has a pin shape.

7. The lighting device according to claim 1, wherein the vertex includes a gap therein, and the protective component includes an insertion portion inserted into the gap.

8. The lighting device according to claim 7, wherein the protective component also includes a head portion from which the insertion portion projects.

9. The lighting device according to claim 8, wherein the insertion portion has a columnar shape configured to fit into the vertex gap and has a size and shape equal to an opening surface of the vertex gap.

10. The lighting device according to claim 9, wherein the head portion has a columnar shape, a spherical shape, or a polygonal shape.

11. The lighting device according to claim 10, wherein the head portion is exposed from the case when the insertion portion is inserted into the vertex gap.

12. The lighting device according to claim 1, wherein each wall portion has a triangular shape.

13. A lighting device capable of illuminating in all directions, the lighting device comprising:

- a case that includes a plurality of wall portions, each including a face in a polygonal shape;
- a plurality of light-emitting elements that are provided in the plurality of wall portions and emit light toward the outside of the lighting device;
- a controller that controls the plurality of light-emitting elements separately; and a protective component without openings that is provided to cover a vertex portion of the case, wherein the case:

is of an outer shape that is spherical or polyhedral; and includes bent portions that are bent in the outer shape of the case, and the bent portions constitute at least three sides of the outer shape of the case, and wherein the plurality of wall portions include two wall portions, each having first and second intersecting edges forming an acute angle therebetween and forming an acute-angle vertex at the point of intersection, one of the two wall portions is bent with respect to the other of the two wall portions, thereby forming a gap between the acute-angle vertices; and the protective component covers the gap between the acute-angle vertices.

* * * * *